April 15, 1941. J. W. WOLF 2,238,764
ICE BLOCK HANDLER
Filed May 11, 1940 2 Sheets-Sheet 2

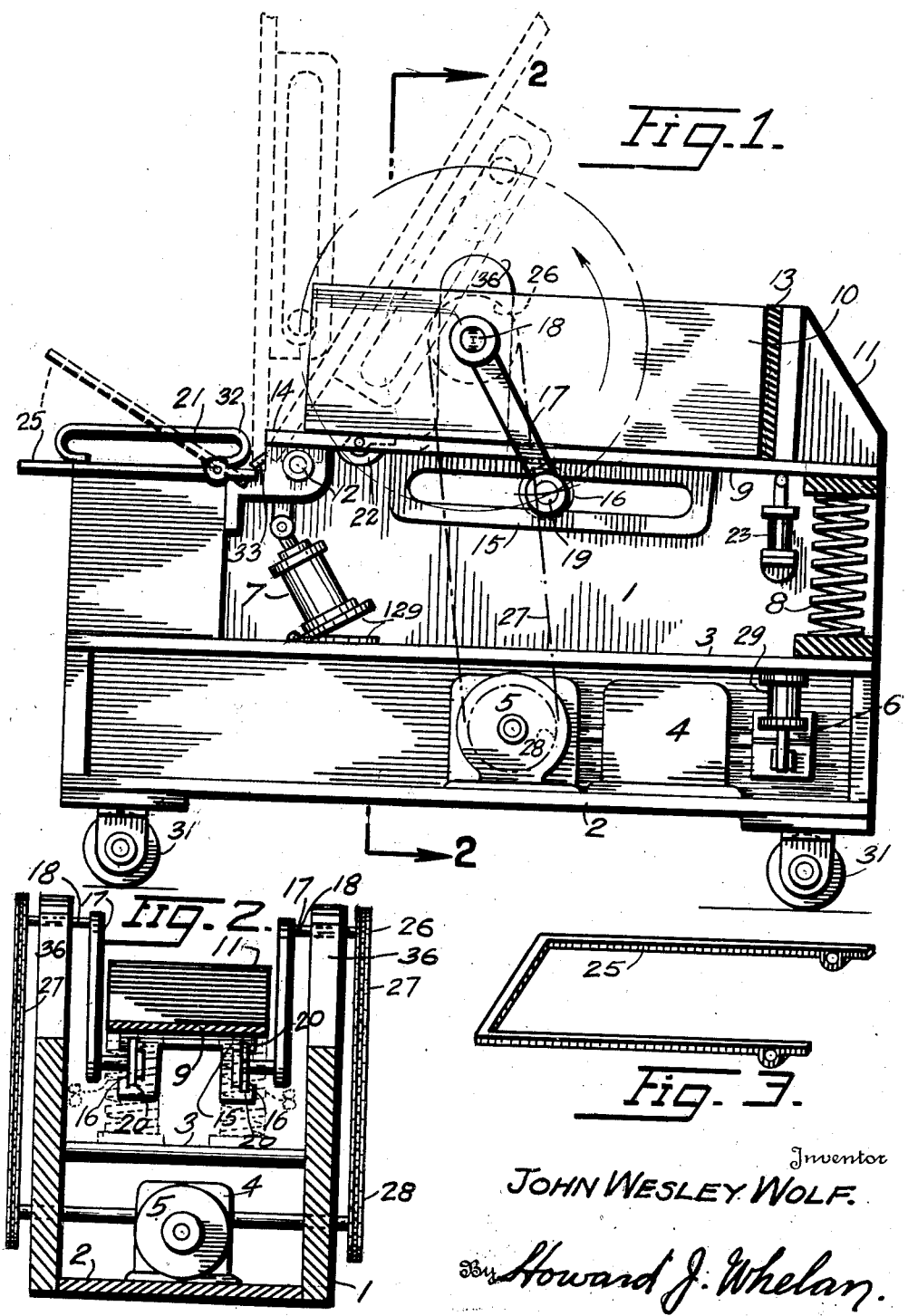

Inventor
JOHN WESLEY WOLF.
By Howard J. Whelan.
Attorney

Patented Apr. 15, 1941

2,238,764

UNITED STATES PATENT OFFICE 2,238,764

ICE BLOCK HANDLER

John Wesley Wolf, Baltimore, Md., assignor to Arlington Ice and Fuel Company, Baltimore, Md., a corporation of Maryland Application May 11, 1940, Serial No. 334,644

2 Claims. (Cl. 214—130)

This invention refers to ice handling equipment and more particularly to an arrangement for handling heavy blocks of ice for disposal at a delivery point. It has among its objects to provide a machine that will receive ice blocks just after manufacture, carry them to a suitable location, lift them up into a vertical position and set them on the delivery platform to be carried away; to eliminate the dangerous work incident to manual handling which such blocks of ice involve; to handling the blocks in such a way as to cushion them against breakage or chipping; to provide for the quick return of the mechanism used after it has functioned in its handling movements; and at the same time have the machine designed for facile placement and transportation of ice blocks and the greater use of the equipment about the plant.

Another object is to have the machine practically self-contained and adaptable for portable use and repair. A further object is to have the machine adjustable in various ways to suit the material handled in the most effective manner, and automatic in its action.

Other objects will become apparent as the invention is more fully set forth.

Block ice handling is usually done by hand, even where devices have been provided to lessen the physical effort required of employees, who have to perform and attend to the work. The effect of the work is so strenuous, because of the weight of the blocks of ice, which is about four hundred pounds, half of which has to be sustained by the workers, that many physical injuries arise, including rupture; broken legs; smashed feet; strained backs, etc. Devices have been developed from time to time to render the work less arduous on the workers but the mechanism has been so complicated, intricate and costly to make and operate that their general utility was questionable. The equipment for handling the ice blocks in small installations required substantial construction and extensive mechanical arrangements. In this invention, the machine is relatively simple in structure, works under small power requirements, is rapid in function, and practically eliminates all the manual handling of the ice blocks from the time they are emptied from the refrigerating containers. The potential force of the ice blocks as they are taken from the containers is utilized to produce part of the operation of the device and thereby eliminate the use of several mechanisms as well as increase its efficiency and effectiveness. The device also places the blocks of ice individually in a position that overcomes the objections to the normal defects or defective structure of the block resulting from the freezing and enables them to be diverted and propelled along the loading platform without danger or trouble, and to be stacked in a proper and suitable manner.

In the drawings which serve to illustrate an example of this invention:

Figure 1 is a side elevation of an ice block handler embodying this invention, with parts broken away to make the underlying structure and mechanism clear; portions being indicated in dotted outline to show the different positions assumed by the parts while they are functioning;

Figure 2 is an end elevation in section taken along line 2—2 of Figure 1;

Figure 3 is a detail in perspective showing the general form of the guard bar used for keeping the ice block from tilting;

Figure 4:
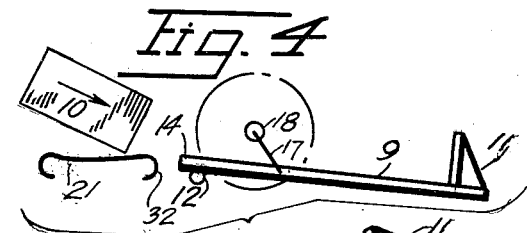
Figure 5:
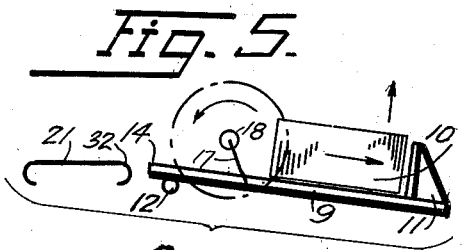
Figure 6:
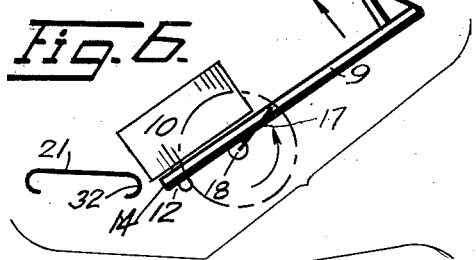
Figure 7:
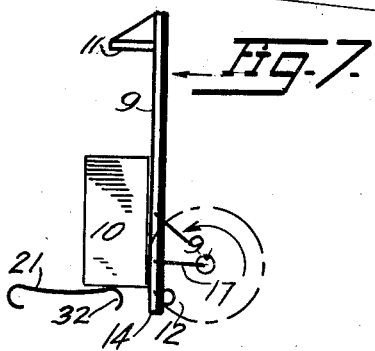
Figure 8:
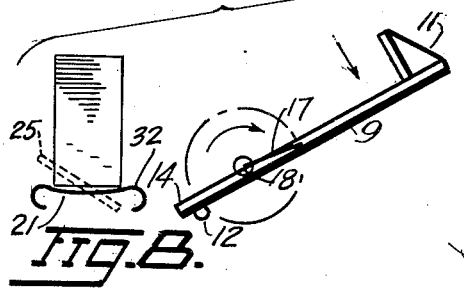
Figure 9:
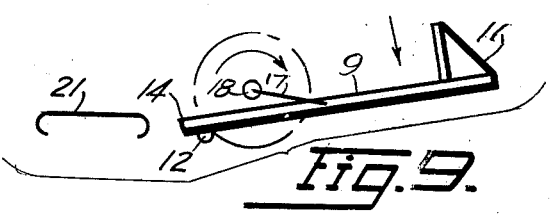
Figure 10:
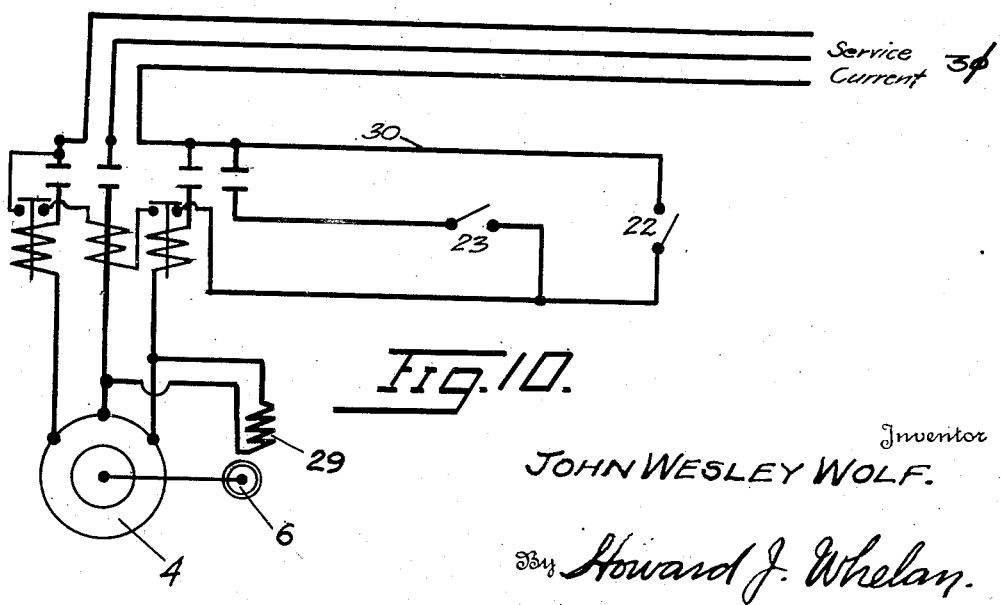

Figures 4, 5, 6, 7, 8 and 9 indicate the movements and operation of the machine in a diagrammatic form, progressively from normal position to block turning and reverse; and Figure 10 is a diagrammatic view of the wiring of the electrical equipment used in this form of the invention.

Similar reference characters refer to similar parts throughout the drawings.

In the construction shown in the drawings, 1, represents a frame and base of a ice block handling machine or handler, in which a lower shelf 2 serves to support the motor 4, the speed changer 5, and brake mechanism 6, and an upper shelf 3 to support the dash pots 7 and resilient absorbing coils 8. A platform 9 hinged at 12 is mounted on top of the frame and serves to carry the block of ice as it is directed to the handler. This platform is designed for the uses to which it is put and is a little longer than the ice block 10 run on to it. It has an end bracket buffer 11 serving as a bumper for the ice block to strike up against and stop on the platform. This bumper is faced with a rubber cushion 13 to absorb some of the momentum of the block and return the latter towards the front edge 14 of the platform, where it will be ready for tilting upwards, as the platform 9 is rotated on its hinge members 12. The underside of the platform is provided with rail frames 15 which are arranged for the rollers 16 to run in as indicated. The rail frames extend across the platform longitudinally and are long enough to permit the platform to tilt or turn from the horizontal plane to the vertical plane, when the arms 17 rotate in a crank-like manner on their supporting shaft 18 and make the pin 19 move the rollers 16 in their tracks 20 in the rail frames 15. In the diagrams in Figures 4, 5, 6, 7, 8 and 9 are shown the positions of the platform as it is raised from the normal position, which is slightly below horizontal, to the vertical. While doing this, it raises a block of ice vertically on the rear end, which having come from the bottom of its ice can or container is flat and smooth, and will support the block vertically without danger of tipping over sidewise or backwards. The other end portion of the ice block is generally soft and rough and is not suitable for resting the free block thereon, it is easily chipped and hard to handle. This machine segregates and selects the "good" end of the block automatically and delivers the block in a more desirable form.

It will be noted that the arms 17 rotate through a full circle of (360°), but that the platform 9 simply hinges or swings up and down through about 90° angle. The raising movement also is made while the arms passes through a travel angle of about 275° which makes it relatively slow compared with the reverse or lowering movement of the platform, as the latter is accomplished through an 85° travel angle. This action is due to the amount of track travel of the rollers 16 on arms 17 and their offset position in relation to the surface of the platform. By making the action of raising slow, the motive power required for raising the ice block is kept relatively small, and prevents the ice block from tilting over off its end portion by the momentum thereof.

In front of the platform 9 is a cushion apron 21. This apron preferably of metal with the front and rear portions 22 and 23 respectively bent around and under and fastened to make a resilient table on which to bounce the ice-blocks when emptied from the ice cans. This apron is fastened to the top surface of the frame and aligned suitably with the platform 9. This alignment permits the apron top surface to rise a little above the edge 14 of the platform 9 when not weighed down with a block of ice and to serve as a stop when the block is stopped at the bumper 11 and bounces back. Further as the platform is raised this hump on the inner edge of the apron assists in holding back the ice block sufficiently to cooperate with the tilting of same by the platform 9. When the platform is vertical and has placed the ice block upright on the apron 21, it trips a swinging guard 25 of U-form up to a position in back of the ice-block to restrain same from tilting backwards off the apron. This is timed to suit the placing of the block thereon and to take up excessive tilting or swaying action in the latter at the moment of vertical erection. After which the guard 25 returns to its normal resting place out of the way of the ice-blocks that follow on to the apron from the containers where they have been frozen in. The circular turning of the arms 17 is brought about by the rotation of the gears 26 on the shaft 18. These gears are driven by chains 27 meshed in gears 28 attached to the speed reducer 5, motivated by the motor 4, which is controlled mechanically by the brake mechanism 6.

This last mechanism consists normally of a brake acting on a drum or the like positioned on the shaft of the motor when its coil 29 is not energized by its circuit 30. The motor 4 for operating the platform and incidental mechanism, functions in the same circuit and is operated by its platform switch 22 which is struck by the oncoming block of ice deposited on the platform 9. A switch 23 acts to open the circuit and stop the motor when the platform 9 arrives back in its normal position under the operation of the arms 17. When the new piece of ice is propelled on to the platform 9 it weighs down the latter and compresses the coil springs 8 and stops on the limit posts. The motor 4 being in service is, at the same time, commencing to turn the arms 17 and lift the platform with the ice block thereon, and follow through the movements outlined in the Figures 4, 5, 6, 7, 8 and 9. The platform also has the dash-pots 7 on its front end underneath so arranged that they absorb some of the jar caused by the sudden return of the table to its normal position. These dash-pots are held on hinged bases 129 that permit them to adjust their positions without injury as it moves through its swinging or hinged travel.

The shaft 18 is supported on brackets 36 mounted on the sides of the frame 1, and places the chains 27, arms 17 and other incidental parts out of the way of the ice as it is put on the machine or taken off. The wheels 31 are placed on four corners to give the machine a portable platform.

The general operation has been indicated in the previous description. However to bring out salient effects in its action, the following characteristics are noted. As the ice block strikes the apron 21, the latter depresses resiliently and prevents chipping and breaking stresses. On the rebound of the apron, it lifts the block 10 and tends to propel it towards the bracket buffer 11, where it is brought to an abrupt stop. The slightly downward slope of the platform 9 serves to positively bring the block against the buffer. The weight of the block depresses the spring coils 8, which absorb the power distributed to them, and on extending facilitate the operation of the rising platform that has been started upwardly by and through the motor mechanism. The arms 17 acting through the rollers 16 raise the platform and slide along the tracks 20, producing a powerful raising movement thereof and on the block of ice. The block braces itself against the edge 32 of the apron, and with the raising of the platform through the remainder of its arc tilts the ice on to the apron, slowly and effectively on the flat and smooth end of the same. The apron depresses resiliently during this action and absorbs any tendency to harm the ice or make it slide off. When the ice and platform are in a vertical position, the lug 33 on the platform lifts the guard bar 25 in back of the block and prevents it tipping over too far, if it should tend to do so. As the platform returns to normal position, it trips the guard 25 so the latter returns to its previous position, out of the way. The dash-pots at the same time also do their part in the conventional manner. The arms 17 continuing their rotation, in a counter-clockwise manner, allow the platform to return quickly to its normal position, open the switch and disconnect the circuit feeding the motor etc. and apply the brake mechanism 6, making the platform ready for the next block.

While but one form of the invention is shown in the drawings and specifications, it is not desired to limit this application for patent to this particular construction, otherwise than limited by the scope of the appended claims, as it is appreciated that other forms and ararngements could be made using the same principles and coming within the sphere of the claims.

Having thus described the invention, what is claimed is:

1. In a handler of blocks of ice of the class described, in combination, a frame, a platform for ice-blocks hinged to the frame, and adapted to normally position itself in tilted relation to and below the horizontal plane, a buffer member for controlling the position of the ice blocks adjacent one end of the platform, a rail member attached to the frame, and an arm arranged to engage in the rail member for moving the platform on its hinged connection, means for rotating the arm, motive means for actuating the last mentioned means, mounted on the frame, means for absorbing the momentum of the ice blocks during their handling on the platform, switch means or the like for controlling the stopping and starting of the moving parts of the handler, a resilient apron adapted to receive the incoming blocks of ice mounted on the frame in front of the said platform and to depress under the weight of the blocks and direct the blocks to the platform after same are discharged on the apron, means for restraining the blocks in a predetermined position on the platform and connected thereto, resilient means for sustaining the platform on the frame and taking up jars and stresses incurred in the handling of the ice-blocks thereon.

2. In a handler of blocks of ice of the class described, in combination, a frame, a platform for ice-blocks hinged to the frame, and adapted to normally position itself in tilted relation to and below the horizontal plane, a buffer member for controlling the position of the ice blocks adjacent one end of the platform, a rail member attached to the frame, an arm arranged to engage in the rail member for moving the platform on its hinged connection, means for rotating the arm, motive means for actuating the last mentioned means, mounted on the frame, means for absorbing the momentum of the ice blocks during their handling on the platform, switch means or the like for controlling the stopping and starting of the moving parts of the handler, a resilient apron to receive the incoming blocks of ice mounted on the frame in front of the said platform and to depress under the weight of the blocks and direct the blocks to the platform after same are discharged on the apron, means for restraining the blocks in a predetermined position on the platform and connected thereto, resilient means for sustaining the platform on the frame and taking up jars and stresses incurred in the handling of the ice-blocks thereon, and brake means for automatically stopping the motive means aforesaid at predetermined periods of the handling of the ice blocks.

JOHN WESLEY WOLF.